United States Patent [19]

Lycan

[11] Patent Number: 5,465,498
[45] Date of Patent: Nov. 14, 1995

[54] GAUGE FOR MEASURING THE DEGREE OF ALIGNMENT AT THE INNER SURFACES OF TWO TUBULAR MEMBERS POSITIONED END TO END

[75] Inventor: Goodwin A. Lycan, Stevensville, Mich.

[73] Assignee: G.A.L. Gage Co., Stevensville, Mich.

[21] Appl. No.: 929,387

[22] Filed: Aug. 14, 1992

[51] Int. Cl.[6] ............................... G01B 3/20; G01B 5/252
[52] U.S. Cl. .................................... 33/645; 33/533; 33/542
[58] Field of Search ............................... 33/645, 533, 542

[56] References Cited

U.S. PATENT DOCUMENTS

| | | | |
|---|---|---|---|
| 1,469,944 | 10/1923 | Merrill | 33/494 |
| 3,483,631 | 12/1969 | Bourgeois | 33/645 |
| 3,869,801 | 3/1975 | Lycan | 33/645 |
| 4,165,566 | 8/1979 | Lycan | 33/542 |
| 4,925,074 | 5/1990 | Wood | 33/645 |

*Primary Examiner*—Christopher W. Fulton
*Attorney, Agent, or Firm*—Baker & Daniels

[57] ABSTRACT

A metric and English measuring gauge including parallel first and second bar members having mutually engaging side faces and including contact end portions for engagement with tubular members wherein the offset of such tubular members will be indicated by the relative longitudinal position of the bar members. A shoulder retaining part is enclosed around the bar members and has windows on opposite sides for observing metric and English scales imprinted un opposite sides of the bar members for measuring wall thickness.

1 Claim, 6 Drawing Sheets

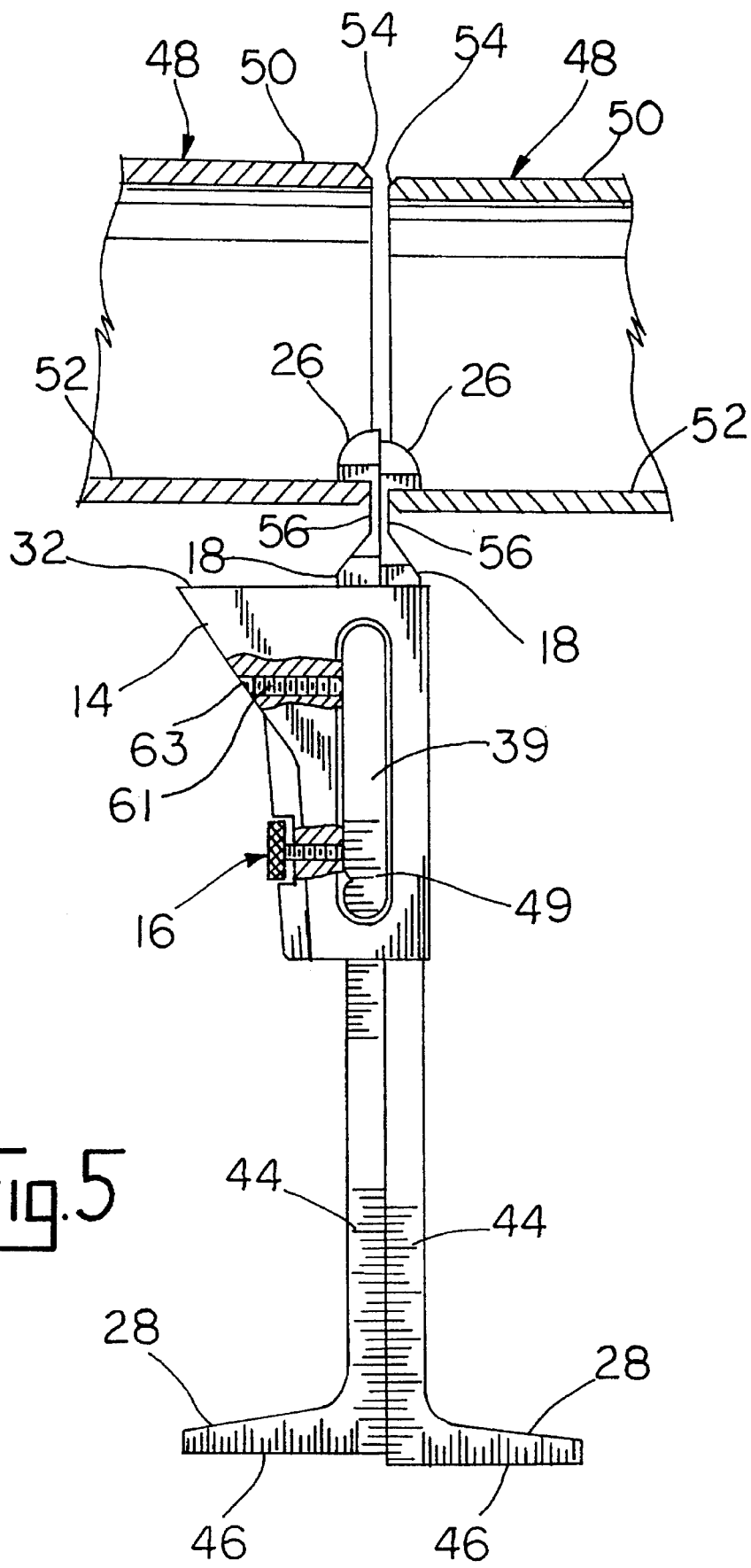

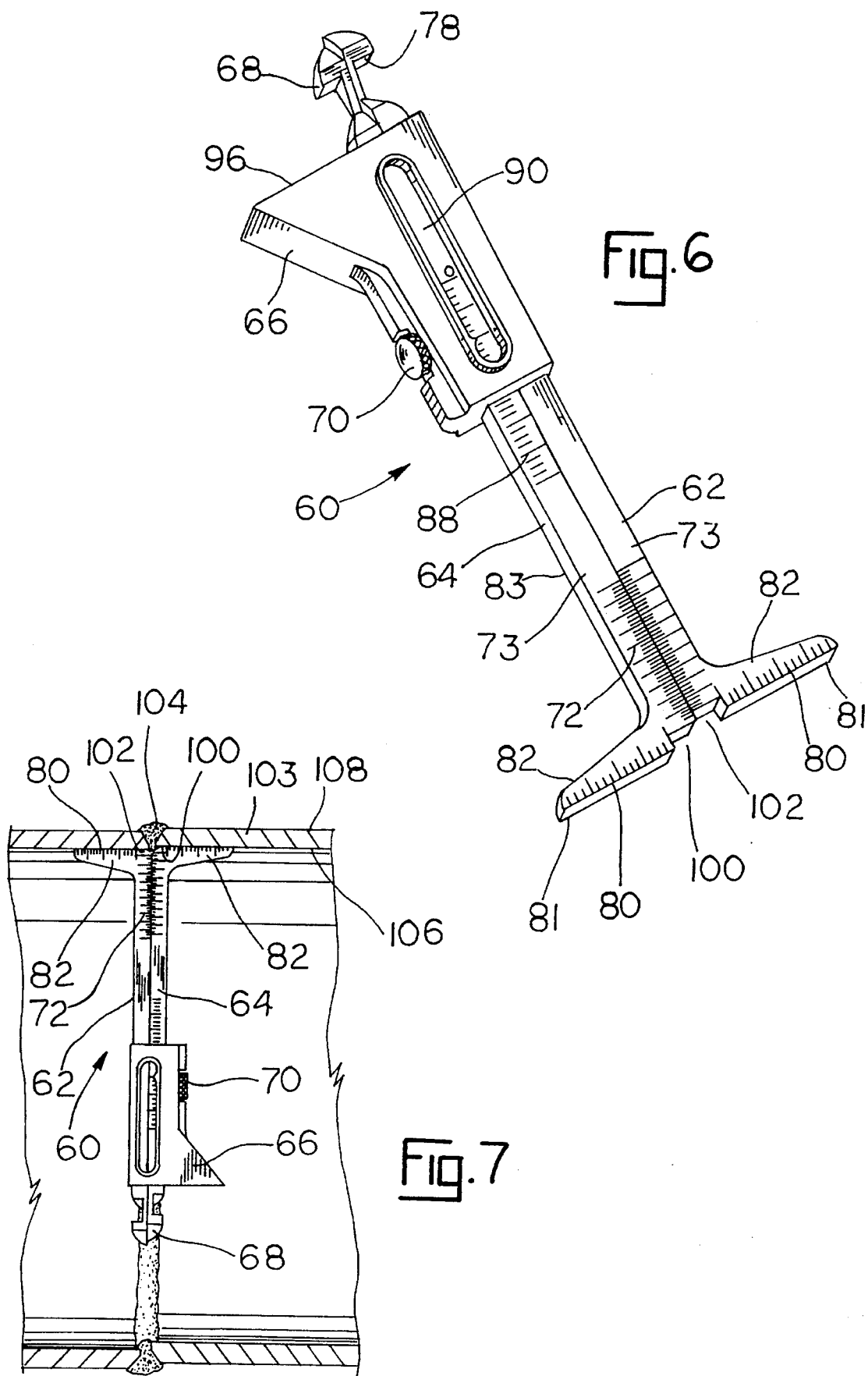

GAUGE FOR MEASURING THE DEGREE OF ALIGNMENT AT THE INNER SURFACES OF TWO TUBULAR MEMBERS POSITIONED END TO END

BACKGROUND OF THE INVENTION

This invention relates to an improved hand held gauge utilized for measuring the degree of alignment of the inner surfaces of two tubular members positioned end to end and further for measuring wall thickness of a tubular member.

SUMMARY OF THE INVENTION

The gauge includes parallel first and second bar members having mutually contacting side faces which extend longitudinally of the bar members. The bar members are shiftable lengthwise or longitudinally relative to each other and have corresponding juxtaposed end parts which are each defined by a laterally projecting contact. These contacts project oppositely of one another in the same plane and each includes an edge face disposed at a substantially right angle to the longitudinal dimension of its bar member. A shouldered retainer part is carried by the bar members. The shouldered retainer part is shiftable along the bar members toward and away from the contact edge faces.

Reference may be had to Patent having U.S. Pat. No. 4,165,566 for a further detailed description. The novelty of this gauge rests in the unique shouldered retainer part and the use of associated indicia on the bars which are readable through the shouldered retainer part. The shouldered retainer part extends around the bar members and has side walls located on opposite sides of the gauge. Each side wall of the retainer part has an oval shaped window. A standard or English scale is imprinted on one side face of the bar members so that the scale may be observed through one window of the overlying retainer part as the retainer part is moved along the bar members. Similarly, a metric scale is imprinted on the opposite face of the bar members so that the scale may be observed through the other window of the overlying retainer part.

Accordingly, it is an object of this invention to provide a manually operable, hand held gauge for measuring and documenting in either English or metric at that the same setting the degree of mis-alignment at the inner surfaces of two tubular members positioned end to end.

Another object of this invention is to provide a multipurpose measuring gauge having an English and metric scale for use in determining the thickness, inner surface alignment and shoulder lengths of tubular members placed end to end.

Other objects of this invention will become apparent upon a reading of the invention's description.

BRIEF DESCRIPTION OF THE DRAWINGS

FIG. 5 is a sectional view of the pipes seen in FIG. 4 showing the gauge in operative position and with portions of the gauge parts broken away for purpose of illustration.

FIG. 6 is a perspective view of the gauge showing a modification to the foot part of each of the gauge's bar members.

FIG. 7 is a sectional view of the pipes showing the gauge of FIG. 6 in operative position measuring the offset of the pipes over a protruding weld.

DESCRIPTION OF THE PREFERRED EMBODIMENT

Figure 1:
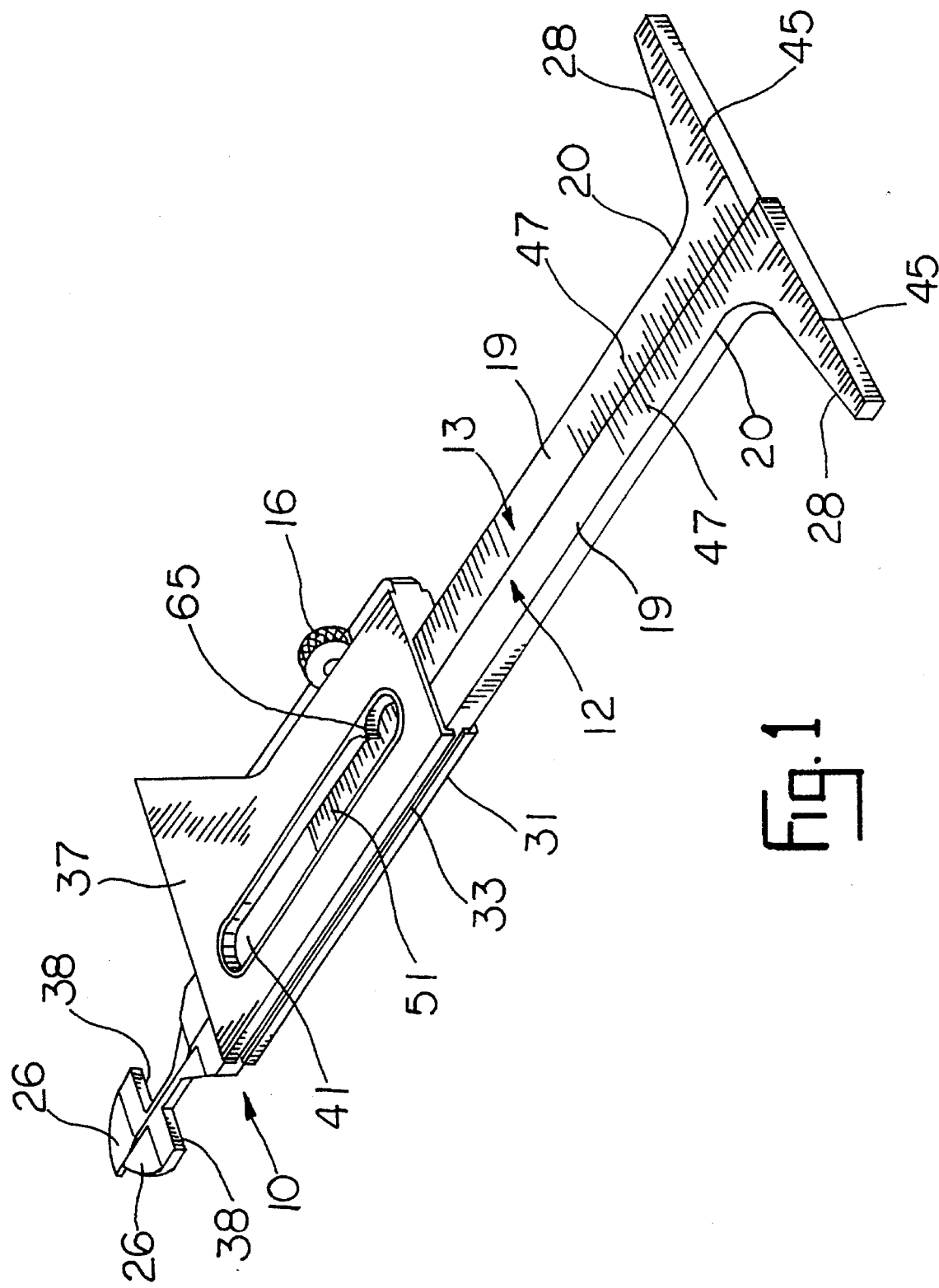
FIG. 1 is a perspective view of the gauge from one side.
Figure 2:
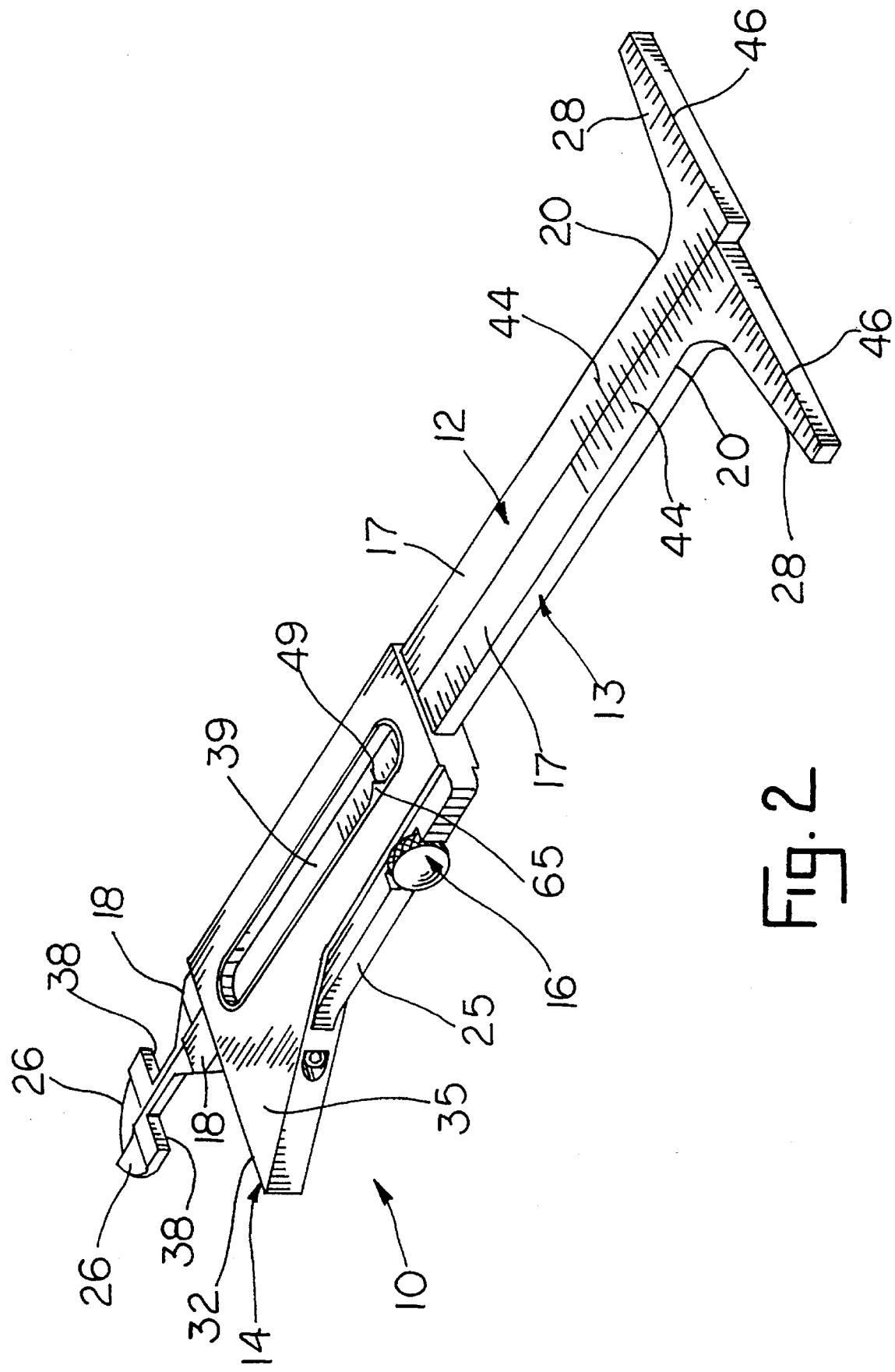
FIG. 2 is a perspective view of the gauge from the opposite side.
Figure 3:
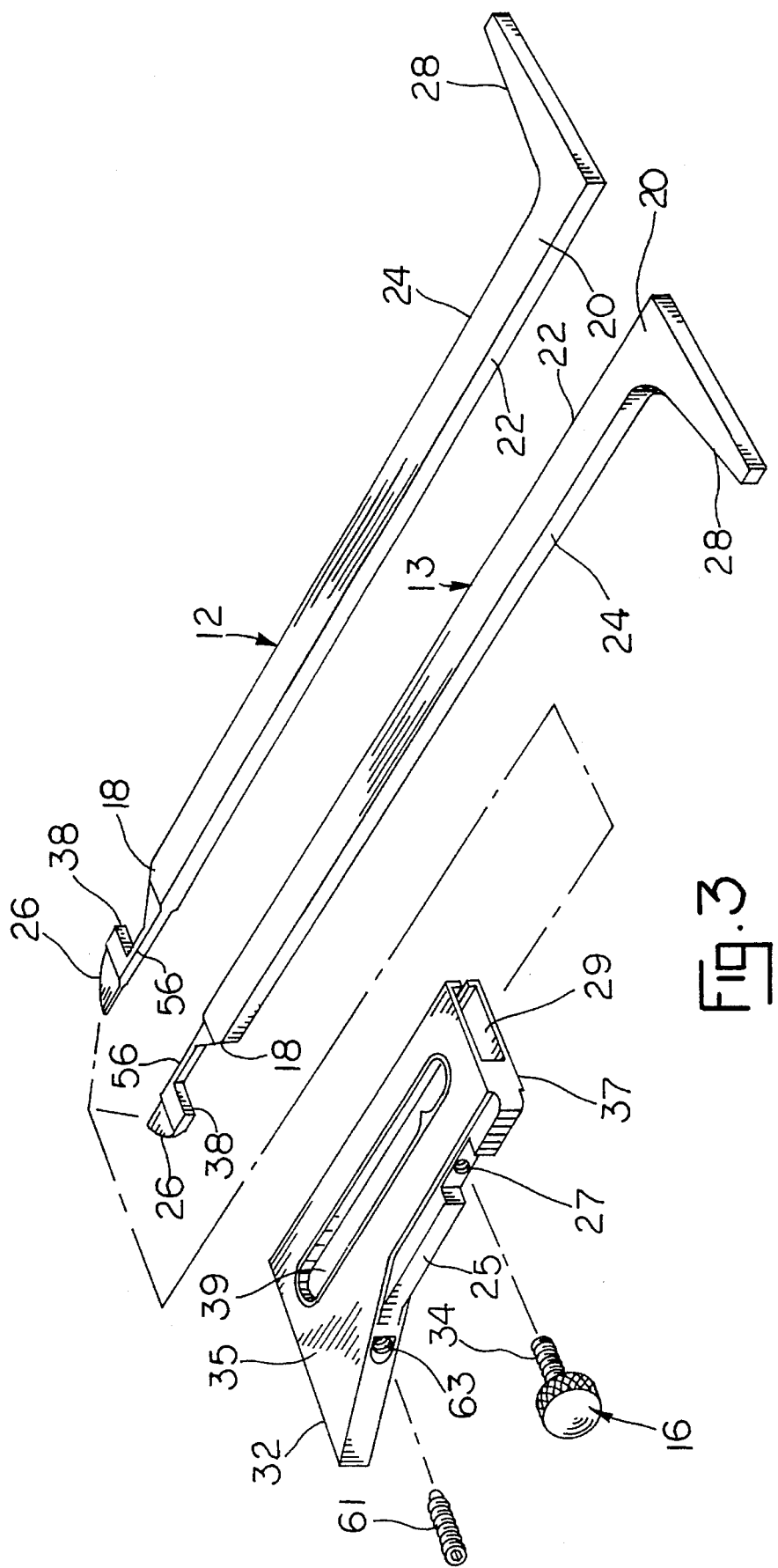
FIG. 3 is a perspective view of the gauge showing the parts thereof in exploded form.

The preferred embodiment illustrated is not intended to be exhaustive or to limit the invention to the precise form disclosed, It is chosen and described in order to best explain the principles of the invention and its application and practical use to thereby enable others skilled in the art to best utilize the invention.

Gauge 10 as shown in the figures includes two bar members 12 and 13, a shoulder retainer part 14 and a tightening screw 16. Each bar member 12 and 13 includes end parts 18 and 20 and oppositely positioned parallel inner side face 22 and outer side face 24 which extend between the end parts along the longitudinal dimension of the bar member. The end part 18 of each bar member 12 and 13 is formed into a contact 26 which projects laterally outwardly from the adjacent side face 24 of the bar member. The opposite end part 20 of each bar member 12 and 13 is formed into a right angular foot part 28 which also projects laterally outwardly from side face 24 of the bar member.

The bar members are placed side by side in mutual contact at side faces 22. Shoulder retainer part 14 is enclosed around bar members 12 and 13 and is fitted against bar member 13 therein. The shoulder retainer part includes a contact surface 32 which extends at a right angular relationship to side face 24 of bar member 13. Tightening screw 16 includes a threaded shank 34 which extends with clearance from edge wall 25 of the shoulder retainer part 14. The screw shank 34 is turned into threaded opening 27 of edge wall 25 of the shoulder retainer part and bears against outer edge 24 of bar member 13.

As explained in U.S. Pat. No. 4,165,566, incorporated herein by reference, bar member 12, 13 slide relative to each other and to retainer part 14. Retainer part 14 includes side walls 35, 37. Side walls 35, 37 each have an oval shaped window 39 and 41 formed therein. Another threaded screw 61 is turned into a threaded opening 63 in retainer part edge wall 25 and lightly against bar member 13 to urge the bar members against each other.

Each contact 26 of bar members 12 and 13 includes an edge face 38 which extends at a right angle to side face 24 of the associated bar member. Contact edge face 38 of bar member 13 parallels contact surface 32 of shoulder retainer part 14 with the shoulder retainer part being shiftable longitudinally along the bar member in an oppositely spaced relationship from the contact edge face. Details about the function and operation of the retainer part 14 and tightening screw 16 is described in U.S. Pat. No. 4,165,566.

Figure 4:
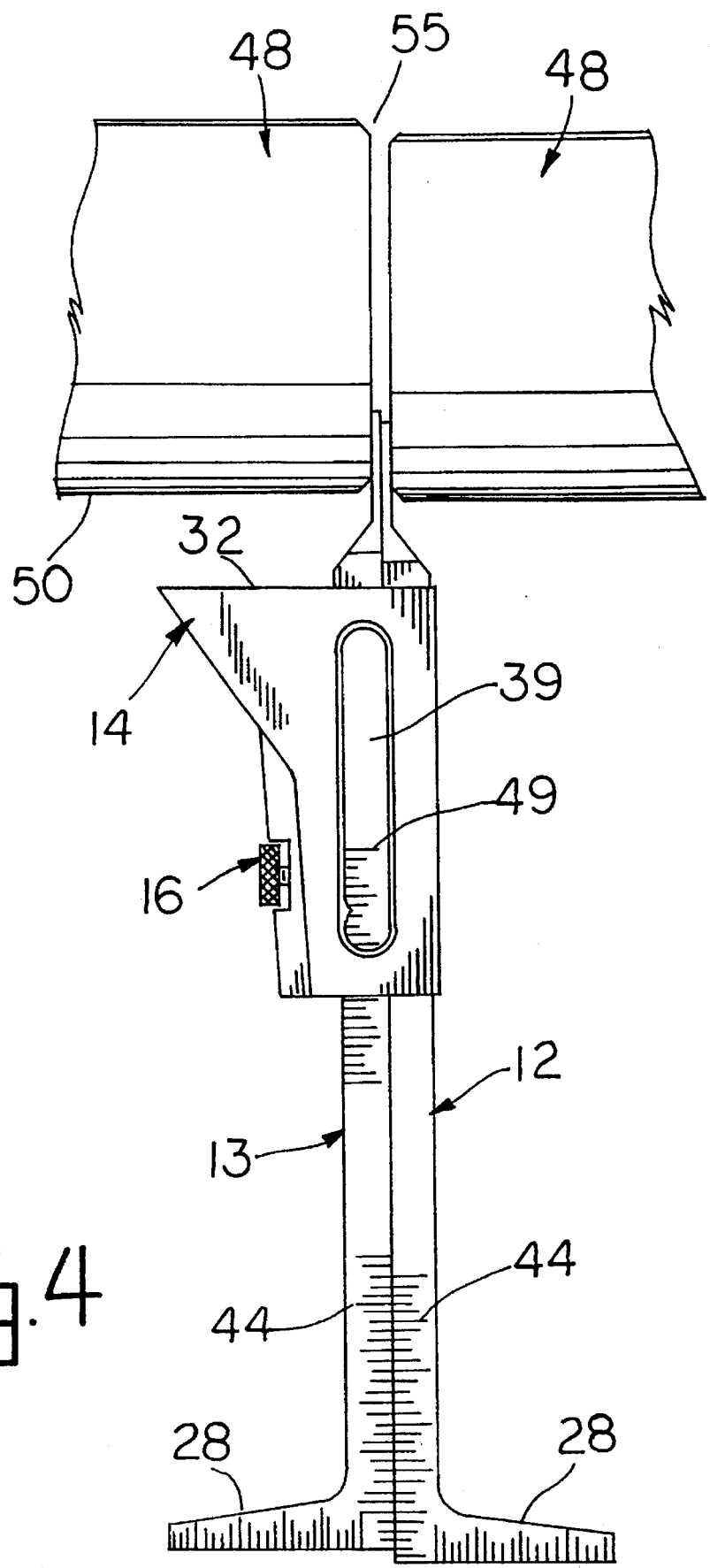
FIG. 4 is a plan view of the gauge being utilized to measure the alignment of abutting pipes.

The operation of the gauge will now be described. In FIGS. 4 and 5, two end to end positioned tubular members or pipes 48 are shown. Each pipe 48 includes an outer surface 50, an inner surface 52 and a beveled end edge 54. End edges 54 of the pipes are located in close proximity, though not touching, and are beveled so as to form in conjunction with one another a groove 55 to accommodate welding of the pipes together. In certain constructions, such as in the construction of a nuclear reactor, the inner surfaces 52 of pipes 48 must be aligned within a close tolerance in order that when the weld is subjected to radiography there will be no drastic density change due to misalignment. Gauge 10 is designed to measure this inner surface pipe alignment. Contacts 26 are of a thin construction and are connected to the body of the bar members 12 and 13 by narrow neck part 56 to enable the contacts to be first inserted edgewise in the spacing between pipe edges 54 and the gauge then turned so that edge face 38 of each contact overlies a pipe inner surface 52 as seen in FIG. 4.

Tightening screw 16 is loosened to permit shifting of the bar members to bring contact edge faces 38 into intimate contact with the respective inner surfaces of pipes 48, while shoulder retainer part 14 can be slid toward the pipes with its contact surface 32 being brought into engagement with the outer surface 50 of one of the pipes. The engagement of shoulder retainer part 14 with one of the pipes squares the gauge relative to at least one of the pipes and ensures a more accurate determination of the degree of alignment of the two pipes. After contact surface 32 of shoulder retainer part 14 and contact edge faces 38 of the bar members are brought into engagement with pipes 48 as shown in FIG. 4 screw 16 may be tightened, locking the bar members and shoulder retainer part together as a unit. The degree of alignment can then be directly read by observing the offset, if any, of either scale 44 or scale 47 depending upon whether the reading is to be in standard or metric terms. Reduced neck parts 56 of contacts 26 will permit the gauge to be turned, causing the contacts to be aligned with the opening between beveled end edges 54 of the pipes, to permit the gauge to be removed with the bar members and shoulder retainer part remaining locked together.

To measure the pipe wall thickness, a user would loosen tightening screw 16 to allow the shoulder retainer part 14 to move. Then, contact 26 of bar member 13 is placed against the inner surface 52 of the pipe as one would do if measuring the degree of alignment of the inner surfaces of the two tubular members positioned end to end. The shoulder retainer part 14 is slid against the pipe's outer surface 50. The screw is tightened and the gauge is removed. The pipe wall thickness is read through either of the windows 39, 41 with the wall thickness being observed on either scale 49 or scale 51 (depending upon whether the reading is to be in standard or metric terms) at indicator 65 protruding from the edge of each window.

In an alternative embodiment as illustrated in FIG. 6 and FIG. 7, gauge 60 illustrated in the drawings includes bar members 62 and 64, which are retained in a parallel relationship with mutually contacting side faces by a shouldered retainer part 66. Each bar member 62, 64 has one end formed into a contact 68, and its opposite end formed into a right angular foot 82. Retainer part 16 also encloses bar members 62, 64 with each bar member being shiftable relative to the other and to the retainer part. A screw member 70 is threaded into retainer part 66 and serves to secure the bar members in place when a measurement is taken.

An English or standard scale 72 also is imprinted upon face 73 of each bar member. Scales 72 are precisely aligned when contact edge faces 78 of the bar members lie within the same plane. Any offset of edge faces 78 as illustrated in FIGS. 6 and 7 will cause the misalignment of scales 72 which indicates to the user of the gauge 60 the amount of such offset. Additionally, a separate set of scales 80 extend along foot parts 82 of the bar members upon faces 73 to permit the measurement across shoulders of adjoining piping or similar tubular members with the bar members being offset to accommodate the offset of the shoulders. A metric scale (not shown) is imprinted upon the opposite face 83 of each bar member. Also, a separate set of metric scales 86 extend along foot parts 82 of the bar members upon faces 83.

Another English or standard scale 88 is also imprinted on face 73 of bar member 64 and is observable through window 90 of shoulder retainer part 66. A metric scale (not shown) is imprinted on the face 83 of bar member 64 and is observable through the opposite window. The scales are used to measure the distance between edge face 78 of bar member 64 and surface 96 of retainer part 66. The manner of operation of gauge 10 as thus far described is similar to the previous embodiment with the exception of the improvement discussed below.

This embodiment involves the forming of notches 100, 102 along the contact surfaces or soles 81 of feet 82 at the inner contacting faces of bar members 62, 64. Constructed in this fashion, gauge 60 may be used to measure the alignment of two tubular members 103 after a weld 104 from either a consumable Ping or an open butt has been applied to join the tubular members.

To utilize gauge 60 in this fashion, feet 82 are positioned so that notches 100, 102 span and overlie the root or protrusion weld 104 between tubular members 103. Feet 82 may be so positioned at the inside surface 106 of tubular members 103, as shown in FIG. 7, or on the outside surface 108 of the tubular members. The amount of offset of tubular members 103 may then be determined by reading scale 72 of gauge 60.

It is to be understood that the invention is not to be limited to the details above given but may be modified within the scope of the appended claims.

What I claim is:

1. In a gauge for measuring the degree of alignment of two tubular members positioned end to end and joined by a consumable ring or an open butt weld, said gauge including parallel first and second bar members having mutually contacting side faces which extend longitudinally of the members, said first bar member being shiftable lengthwise relative to said second bar member over the contacting side faces thereof, said bar members including oppositely extending foot parts, each foot part projecting at a general right angle to the longitudinal dimension of its included bar member and having a contact surface paralleling the contact surface of the foot part of the other bar member for engaging a surface of a said tubular member, the improvement wherein each foot part has a notch formed in its said contact surface at the contacting side face of its said included bar member, each notch cooperating with the other notch to define slot means for spanning said weld with the foot part contact surfaces engaging the surface of said tubular member, whereby said degree of alignment of the tubular member can be measured.

* * * * *